United States Patent [19]

Swinkels et al.

[11] Patent Number: 4,867,991
[45] Date of Patent: Sep. 19, 1989

[54] METHOD OF RECOVERING BEER

[75] Inventors: Wilhelmus J. P. M. Swinkels, GC Beek en Donk, Netherlands; Karl Wackerbauer, Berlin; Udo Stein, Ahlen both of Fed. Rep. of Germany

[73] Assignee: Westfalia Separator AG, Oelde, Fed. Rep. of Germany

[21] Appl. No.: 94,946

[22] Filed: Sep. 9, 1987

[30] Foreign Application Priority Data

Sep. 16, 1986 [DE] Fed. Rep. of Germany ....... 3631470

[51] Int. Cl.$^4$ ............................................. D12C 11/04
[52] U.S. Cl. ..................................... 426/16; 426/493; 426/495; 426/490
[58] Field of Search ................. 426/16, 493, 494, 495, 426/592, 11, 490

[56] References Cited

U.S. PATENT DOCUMENTS

| 3,117,005 | 1/1964 | Coutts | 426/16 |
| 3,123,475 | 3/1964 | Wendt et al. | 426/16 |
| 3,940,492 | 2/1976 | Enstrom | 426/16 |

*Primary Examiner*—Marianne Cintins
*Attorney, Agent, or Firm*—Sprung Horn Kramer & Woods

[57] ABSTRACT

Lager-cellar or fermentation-cellar yeast is mixed with an extraction liquid prior to centrifugal processing, increasing the percentage of recovered beer. To keep the contact time brief the extraction liuquid is not mixed with the yeast until just upstream of the intake into the centrifuge. The total requisite volume of extraction liquid is made available in a recirculation tank and circulated through the centrifuge until all the yeast has been processed. The extraction liquid is maintained at a temperature no higher than $+2°$ C. The low temperature and brief contact time prevent the transition of yeast-metabolism products into the extraction liquid.

21 Claims, 1 Drawing Sheet

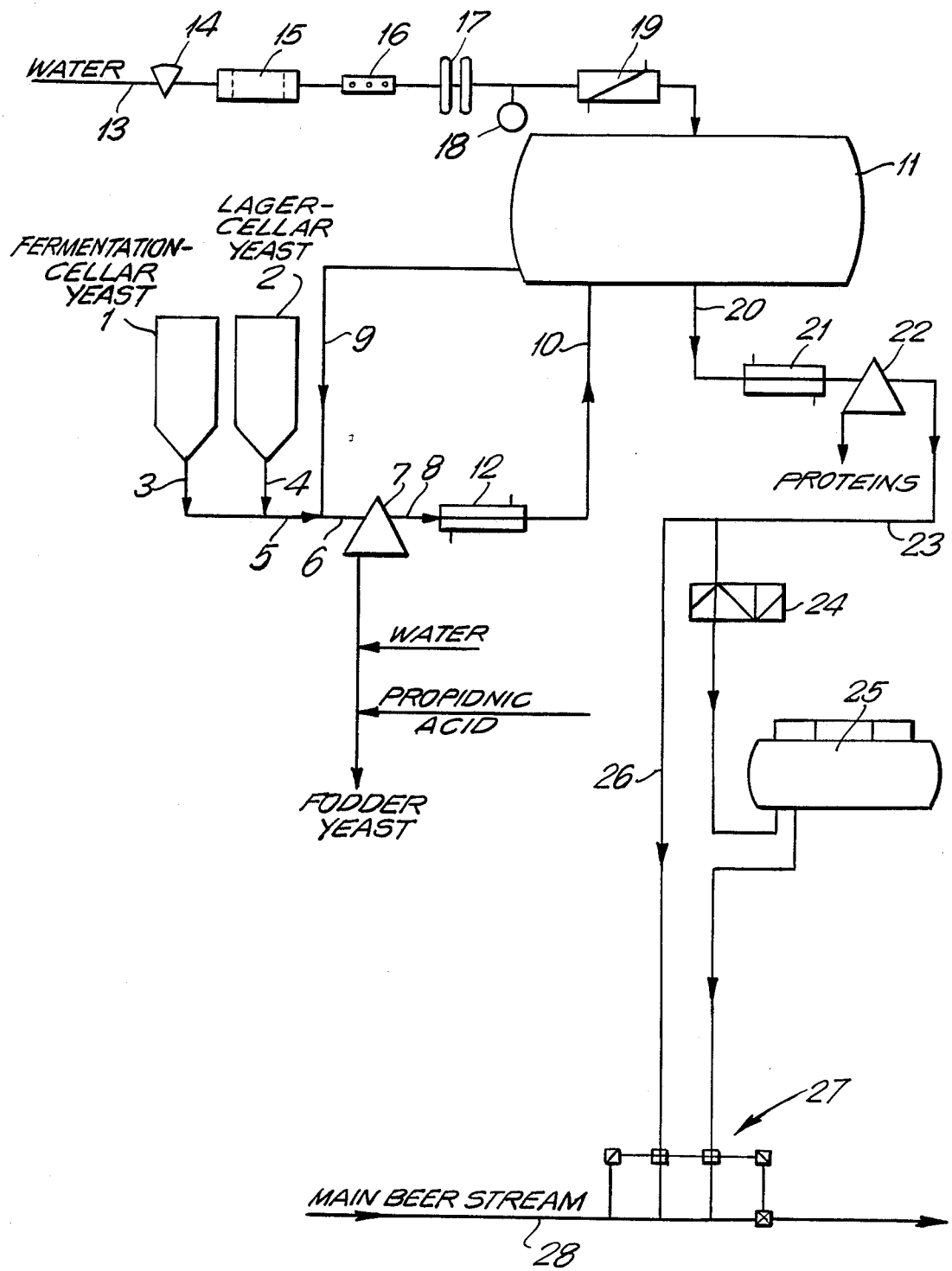

METHOD OF RECOVERING BEER

BACKGROUND OF THE INVENTION

The present invention relates to a method of recovering beer from fermentation-cellar or lager-cellar yeast in breweries, whereby the yeast introduced into the intake of a centrifuge is separated into a concentrated solid phase and a liquid phase that contains beer.

The previously known method is limited to concentrating the fermentation-cellar or lager-cellar yeast by means of centrifuges, presses, or filters in order to recover beer from the yeast. The obtainable dry contents in the yeast concentrate range from 20 to 35%. A considerable proportion of the beer contained in the yeast is accordingly consigned to low-value exploitation, being sold along with the yeast as fodder.

Since excise taxes in many countries are based not on the amount of beer but on the amount of brew, the breweries in these countries are especially interested in recovering as much beer as possible from the by-products of alcoholic fermentation.

SUMMARY OF THE INVENTION

The object of the present invention is to provide a method of increasing the amount of beer recovered during the centrifugal processing of fermentation-cellar or lager-cellar yeast.

This object is attained by an improvement wherein the yeast is mixed with an extraction liquid before centrifugal processing.

The addition of extraction liquid dilutes the beer that surrounds the cells of the yeast. The solid phase leaving the centrifuge will accordingly, although it contains the same proportion of liquid as in the known method, contains less beer in accordance with the particular ratio between the extraction liquid and the proportion of liquid in the fermentation-cellar or lager-cellar yeast employed in the mixture.

To keep the duration of contact between the extraction liquid and the yeast brief, the extraction liquid is mixed with the yeast directly in the intake into the centrifuge, preventing yeast-metabolism products inside the yeast cells from getting into the extraction liquid along with the beer.

It turns out to be practical for the inflow of the extraction liquid to be adjusted to that of the yeast at the intake into the centrifuge to obtain a mixture with a ratio of extraction liquid to yeast of 7:1.

In one preferred embodiment of the invention the requisite amount of extraction liquid is kept available in a recirculation tank before being conveyed into the intake into the centrifuge and the liquid leaving the liquid outlet from the centrifuge is returned to the recirculation tank. The extraction liquid can accordingly be repeatedly brought into contact with the yeast flowing through the centrifuge, resulting in a higher beer content in spite of the brief duration of contact.

The volume of extraction liquid available in the recirculation tank should equal no more than 75% of the volume of liquid containing the beer existing subsequent to extraction.

Subsequent to completion of the extraction process the extraction liquid should have a Plato content of 3-15%.

The extraction liquid should be chilled before being transferred to the recirculation tank to prevent disadvantageous heating of the yeast during the extraction process. The heating of the extraction liquid due to the centrifugal processing can be compensated for by a cooler downstream of the liquid outlet from the centrifuge.

To ensure high quality on the part of the recovered beer the temperature of the extraction liquid should not exceed $+2°$ C.

Water can be employed as an extraction liquid. The water can be treated with cation exchangers, filters, ultraviolet sterilizers, and air removers and can be carbonated and chilled before being used.

The quality of the accordingly obtained beer-containing liquid can be improved even more if it is conveyed to a clarifier. There can be a cooler upstream of the clarifier.

The clarifier will preferably be a heavy-duty clarifying centrifuge that removes any cloudiness still present. Cloudiness is due to insoluble tanning-agent-and-protein complexes. A clarity of 0.5-1.5 EBC is desirable.

The liquid containing the beer can be pasteurized, krausened at a temperature no higher than $+10°$ C., physically and chemically stabilized with stabilizers, washed with $CO_2$ or another inert gas, subjected to a brew-house process, including an anti-clouding process, returned to fermentation or lagering, intersected with the main stream of beer, intersected with the lager beer, and/or processed into an independent type of beer.

Some preferred embodiments of the invention will now be specified with reference to the attached drawing, wherein:

BRIEF DESCRIPTION OF THE DRAWING

The FIGURE is a flow chart of the method according to the invention.

DETAILED DECRIPTION OF THE PREFERRED EMBODIMENT

The drawing shows two cylindroconical tanks—a tank 1 for fermentation-cellar yeast communicating through its outlet line 3 with a line 5 and a tank 2 for lager-cellar yeast communicating through its outlet line 4 with line 5. Line 5 opens into the intake 6 of a centrifuge 7. The intake 6 into and the outlet 8 from centrifuge 7 communicate with a recirculation tank 11 through recirculation lines 9 and 10. A cooler 12 is located in recirculation line 10. Recirculation tank 11 can be filled from a line 13 that includes a cation exchanger 14, a filter 15, an ultraviolet sterilizer 16, an air-remover 17, a $CO_2$ impregnator 18, and a cooler 19 for conditioning the extraction liquid. An emptying line 20 with a cooler 21 leads from recirculation tank 11 to a heavy-duty clarifying centrifuge 22. The outlet 23 from heavy-duty clarifying centrifuge 22 communicates, either via a pasteurizer 24 and a fermentation vat 25 or directly via a line 26, with a intersector 27 in a beer line 28.

An extraction liquid in the form of a requisite amount of conditioned water, equalling approximately 75% of the volume of beer-containing liquid present subsequent to extraction, is made available in the recirculation tank. The extraction liquid is circulated through centrifuge 7, subsequent to which the yeast is mixed in at the intake 6 into centrifuge 7. The extraction liquid and the yeast are then immediately separated in the centrifuge, so that they are actually in contact only very briefly.

The cooler 12 downstream of centrifuge 7 compensates for any heating of the extraction liquid due to the centrifuging process. The brief contact time and the low temperature of the extraction liquid prevent undesired transition of yeast-metabolism products from the extraction liquid. The extraction liquid is conveyed through the centrifuge until a Plato content of approximately 3 to 15% is attained.

Upon termination of the extraction process the extraction liquid is conveyed to heavy-duty clarifying centrifuge 2.

Centrifuges of this type operate at centrifugal accelerations of up to 15000 g and can accordingly remove even the insoluble tanning-agent-and-protein complexes still in the beer and responsible for residual clouding. Clarities ranging from 0.5 to 1.5 EBC can be attained with these devices.

Pasteurization and krausening or recirculation to fermentation or to the vicinity of the brew house may be practical before the accordingly treated extraction liquid is intersected with the finished beer.

The yeast extracted by centrifuge 7 will contain 19% dry substance. It is adjusted with water to a dry-substance content of 13% to make it flow better and is preserved by adding propionic acid. The accordingly treated yeast can be sold for fodder.

What is claimed is:

1. A method of recovering beer from fermentation-cellar or lager-cellar yeast in breweries, comprising mixing yeast with an extraction liquid stored in a recirculation tank by forming a ratio of inflow for the extraction liquid and the yeast such that the ratio of the extraction liquid to the yeast is at least 7:1 introducing the mixture of yeast and extraction liquid into an intake of a centrifuge and separating the yeast in the centrifuge into a concentrated solid phase and a liquid that contains beer, wherein during said separating step, extraction liquid from the tank is conveyed to the intake of the centrifuge and beer-containing extraction liquid leaving a liquid outlet of the centrifuge is returned to the recirculation tank.

2. The method as in claim 1, wherein step of mixing comprises mixing the extraction liquid with the yeast directly in the intake of the centrifuge.

3. The method as in claim 1, wherein the volume of extraction liquid stored in the recirculation tank equals no more than 75% of the volume of liquid containing the beer existing subsequent to extraction.

4. The method as in claim 1, wherein, subsequent to separating, the extraction liquid has a Plato content of 3–15%.

5. The method as in claim 1, further comprising chilling the extraction liquid before storing same in the recirculation tank.

6. The method as in claim 1, further comprising chilling the beer-containing liquid leaving the centrifuge before returning to the recirculation tank.

7. The method as in claim 1, wherein the temperature of the extraction liquid does not exceed +2° C.

8. The method as in claim 1, comprising using water as an extraction liquid.

9. The method as in claim 8, further comprising treating the water with at least one of cation exchangers, filters, ultraviolet sterilizers, and air removers and carbonating and chilling before using same.

10. The method as in claim 1, further comprising clarifying the contents of the recirculation tank in a clarifier.

11. The method as in claim 10, further comprising disposing a cooler upstream of the clarifier.

12. The method as in claim 10, wherein the clarifier is a heavy-duty clarifying centrifuge.

13. The method as in claim 1, wherein the liquid containing the beer is pasteurized.

14. The method as in claims 1, wherein the liquid containing the beer is krausened at a temperature no higher than +10° C.

15. The method as in claim 1, wherein the liquid containing the beer is physically and chemically stabilized with stabilizers.

16. The method as in claim 1, wherein the liquid containing the beer is washed with $CO_2$ or another inert gas.

17. The method as in claim 1, wherein the liquid containing the beer is subjected to an anti-clouding process.

18. The method as in claim 1, wherein the liquid containing the beer is returned to fermentation or lagering.

19. The method as in claim 1, wherein the liquid containing the beer is intersected with a main stream of beer.

20. The method as in claim 1, wherein the liquid containing the beer is intersected with a lager beer.

21. The method according to claim 1, wherein the volume of extraction liquid stored in the recirculation tank equals no more than 75% of the volume of liquid containing the beer existing subsequent to extraction, and wherein the temperature of the extraction liquid does not exceed +2° C.

* * * * *